July 23, 1935.  P. B. FLANDERS  2,008,857
MECHANICAL IMPEDANCE METER
Filed April 4, 1933  2 Sheets-Sheet 1
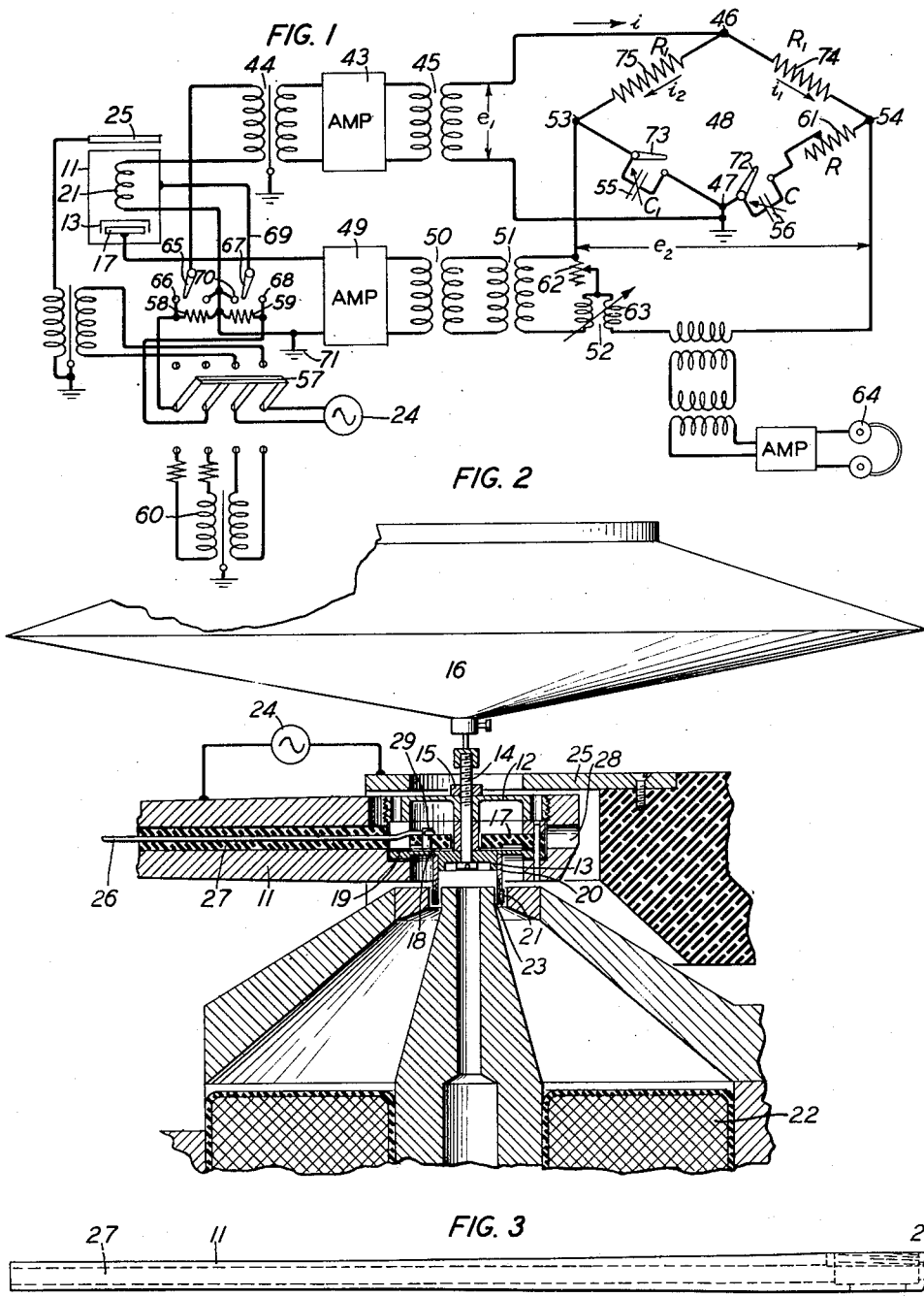
INVENTOR
P. B. FLANDERS
BY
*G. M. Campbell*
ATTORNEY July 23, 1935.  P. B. FLANDERS  2,008,857
MECHANICAL IMPEDANCE METER
Filed April 4, 1933   2 Sheets-Sheet 2

INVENTOR
P. B. FLANDERS
BY
*G. W. Campbell*
ATTORNEY

Patented July 23, 1935

2,008,857

UNITED STATES PATENT OFFICE 2,008,857

MECHANICAL IMPEDANCE METER

Paul B. Flanders, East Orange, N. J., assignor to Bell Telephone Laboratories, Incorporated, New York, N. Y., a corporation of New York Application April 4, 1933, Serial No. 664,308

7 Claims. (Cl. 73—51)

The invention relates to the measurement of mechanical impedance and more particularly to methods of and means for measuring the mechanical impedance of vibratory bodies at specified frequencies in a wide frequency range.

The principal object of the invention is a direct reading impedance meter of high and uniform sensitivity over a wide range of impedances and frequencies.

As described more in detail in Patent 1,880,425 granted to me, October 4, 1932, a mechanical impedance may be regarded as the mechanical analogue of an electrical impedance. The impedance of a mechanical system may, therefore, be expressed in mechanical ohms (c. g. s. units) as the complex ratio of the force impressed on the system to the velocity produced in the system by that force, the force and the velocity being the analogues respectively of the electromotive force and the electric current.

According to the general features of the invention, the body or system to be measured is coupled to a vibrating system having means for producing directly voltages which vary respectively with the instantaneous velocity of the system and the instantaneous force required to drive the system.

In the preferred embodiment of the invention, the impedance to be measured is connected to a vibrating system comprising a coil and the moving electrode of a condenser transmitter and this system is elastically coupled to a tuned bar carrying the other electrode of the transmitter. The bar is vibrated electrostatically at the test frequency and due to the elasticity of the coupling the moving system will vibrate with respect to the bar in a manner determined by the nature and magnitude of its impedance. The voltage generated in the coil will be proportional to its instantaneous velocity and the voltage generated by the condenser transmitter will vary with the displacement between the electrodes and hence with the force necessary to drive the moving system. These voltages are suitably amplified and balanced against each other through variable bridge elements which may be calibrated to read directly in mechanical ohms. Since this meter indicates the force and velocity directly, its sensitivity is substantially uniform for a wide range of impedances and readings may be taken over a wide range of frequencies by merely varying the tuning of the bar and the frequency of the driving force.

The invention will be more clearly understood from the following detail description and the accompanying drawings in which:

Fig. 1 is a circuit diagram of an impedance meter according to this invention;

Fig. 2 is a detail view of the vibrating system;

Fig. 3 shows the vibrating bar;

Figure 4:
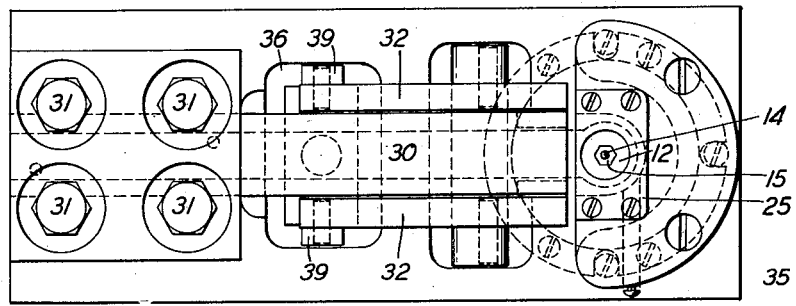
Figs. 4 and 5 are assembly views of the tuned vibrating system.

Referring first to Fig. 2 the bar 11, which may be tuned to any desired test frequency as will be more fully described, is drilled and threaded at its free end to receive the duralumin diaphragms 12 and 13 which are rigidly coupled together at their centers by a bolt 14. This bolt extends beyond the nut 15 to form a connection with the loudspeaker 16 or other device whose impedance is to be measured. Clamped between the diaphragms is an annular insulator member 17 the face 18 of which is gold plated and spaced about 3 mils from the diaphragm 13 by a washer 19 to form the electrode of the condenser transmitter. Secured to the lower side of the diaphragm 13 is a phenol fiber tubular piece 20 supporting, in the gap 23, a coil 21 which is vibrated in the magnetic field produced by the winding 22.

The bar 11 is driven at any desired frequency by the oscillator 24 which is connected between the bar and the driving plate 25 as shown. This plate is cut away above the diaphragm 12 so that the electrostatic force is exerted on the bar and the moving system is permitted to vibrate in accordance with its own impedance. Since no polarizing voltage is used in connection with the oscillator 24 the bar will vibrate at twice the oscillator frequency and the latter can be controlled accordingly to produce the desired vibration of the bar. Polarizing voltage for the condenser transmitter is applied between the electrode 18 and the diaphragm 13 by conductor 26 and since the variations in capacity in the condenser transmitter are very small, it is essential to accuracy that there be no variation in the capacity between the conductor 26 and the bar 11 when the latter is vibrating. One convenient way of preventing the conductor from vibrating is to mount the wire in the bore 27 and extend it through the opening 28 so that it can be tensioned in the center of the bore. One end of the bore is then sealed by a plug and a suitable powdered thermoplastic resin such as polystyrene is poured into the open end and pressed down with a tubular plunger. When the bore is entirely filled the plunger is clamped in place and the bar is heated to fuse the material around the conductor. After cooling the plug and plunger are removed and the corroded material adjacent them is scraped away to insure high insulation resistance between the conductor and the bar. The conductor is then cut and attached to the terminal 29 of the electrode 18.

The preferred mechanism for tuning the bar 11 as shown in Figs. 4 to 7 is claimed in a copending application of T. Aamodt, Serial No. 664,389, filed April 4, 1933. It consists essentially of clamps 30 with screws 31 for forcing the clamps into contact with the bar and jaw members 32 having projections 33 engaging the clamps and means for turning the jaws about the pivot 34 to force the clamps apart and progressively increase the unclamped length of the bar. In the structure shown the clamp faces are flat but the faces of the bar are contoured to the deflection curves of the clamps when they are under a suitably distributed load. The radius of curvature, at any point along the face of such a bar is therefore greater than if the contours were those of a beam under the same load concentrated at its free end. Hence with properly designed clamps a concentrated force applied to the ends of the clamps when they are held in contact with the bar by screws 31 throughout their length, will first release only the ends of the clamps from the bar and as the concentrated force is increased the free length of the bar is progressively increased.

Figure 5:
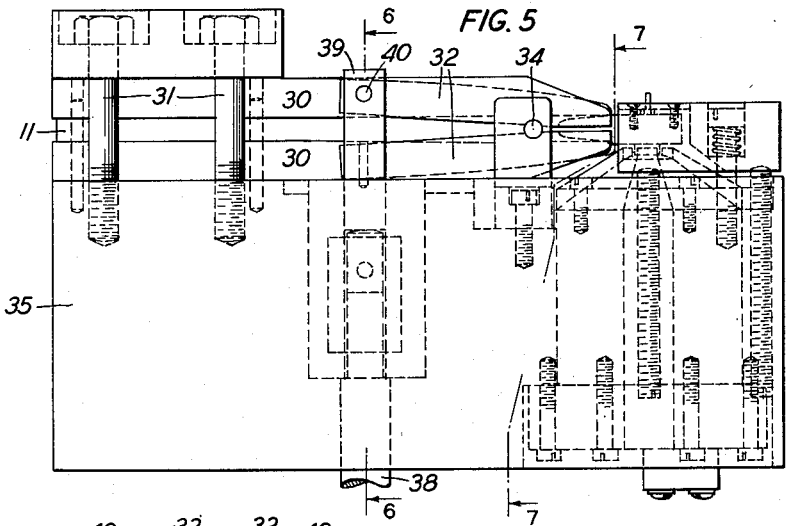
Figure 6:
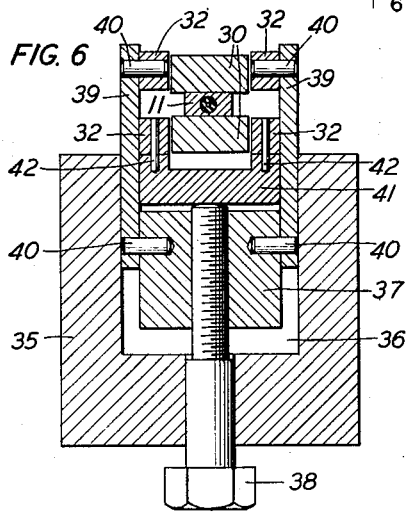
Fig. 6 is a sectional view and Fig. 7 an end view of the clamp operating means.
Figure 7:
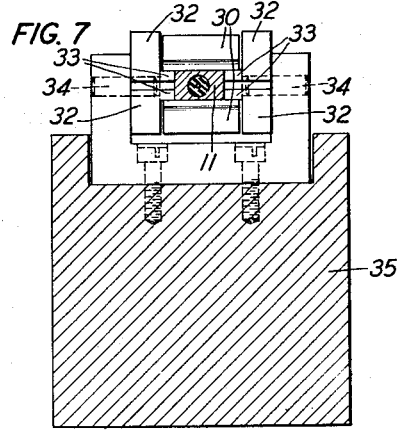

When the clamps are in contact with the bar over their entire length the bar resonates at its highest frequency and by spreading the jaws any desired resonant frequency may be obtained over a wide range as for example, from 11,000 to below 300 cycles per second. If higher or lower frequencies are required the bar may be proportioned accordingly and where necessary a series of interchangeable bars may be provided each of which is capable of being tuned to a portion of the desired range. The jaws may be conveniently operated by the mechanism shown in Fig. 6. In the rectangular cavity 36 in the base block 35, the block 37 is threaded to receive the machine screw 38 and is connected to the upper set of jaws 32 by the straps 39 and the dowel pins 40. The end of the screw 38 contacts the bottom of the member 41 which is connected to the lower jaws 32 by dowel pins 42 and is adapted to move vertically between the straps 39. When the screw 38 is forced against the member 41 the ends of the lower jaws are moved upwardly and at the same time the movement of the screw through the block 37 pulls downwardly on the straps 39 and the ends of the upper jaws. With this arrangement the forces applied to the upper and lower jaws will be the same and since both sets are in contact with the pivot 34 the other ends of the jaws will spread and force the clamps 30 apart by means of the projections 33. It will be noted that these projections are contoured as shown in Fig. 5 in such a way that as the clamps are forced apart the force is always applied to the end of the clamp so that contact between the clamps and the bar 11 is broken progressively along the clamp to progressively decrease its resonant frequency.

In Fig. 1 the coil 21, the condenser electrodes 13, 18 and the electrostatic driving plate 25 are indicated schematically to show their electrical relation to the rest of the circuit. The coil is coupled to the amplifier 43 by the transformer 44 and the output of the amplifier is impressed through transformer 45 on the terminals 46, 47 of the bridge circuit 48. It will be understood that in practice the elements of the bridge 48 must be suitably shielded in accordance with well known principles to localize the distributed capacities but in order to avoid unnecessary complication of the drawings this shielding has not been shown. The condenser transmitter is connected through amplifier 49, transformers 50, 51 and the equalizing network 52 to the terminals 53, 54 of the bridge.

As stated in general terms above the procedure in using the bridge for impedance measurements is to balance against each other the generated voltages the ratio of which is the mechanical impedance of the moving system. Under a condition of balance the settings of the bridge elements will be a measure of the desired impedance but before the actual impedance can be obtained the bridge must be calibrated and any phase angle between the voltages $e_1$ and $e_2$ applied to the bridge which is due to a difference in the transmission characteristics of the two channels must be eliminated.

Due to the use of transformers and multi-stage amplifiers the transmission of these two channels will not be the same with respect to either phase angle or amplitude but these differences may be corrected for any single test frequency by means of the network 52. The variable condensers 55, 56 in the bridge 48 are short circuited by their respective switches and switch 57 is closed in its lower position. The oscillator 24 is set for the desired frequency and impresses an alternating voltage on the resistors 58, 59, through the transformer 60. Switch 65 is closed on contact 66 and switch 67 on contact 68 so that the voltage across resistor 58 is impressed on transformer 44 through the coil 21 and the voltage across resistor 59 is impressed on amplifier 49 through the condenser transmitter since the conductor 69 is connected to the bar 11 which is in contact with the diaphragm 13 of the transmitter. These voltages are not necessarily of equal value but they must be in phase with each other. The resistance 61 is set for a value within the equalization limit and the resistor 62 and the inductance 63 of the equalizer 52 are adjusted until no sound is heard in the receiver 64. The channels are then equalized with respect to phase angle and magnitude and the system is ready to be used for an impedance measurement at this particular frequency. The value of resistance 61 determines the magnitude of the constant (K) used in equations below for the mechanical impedance measurements.

When the system is equalized and a mechanical impedance is to be measured the switch 57 is closed upwardly and the bar tuning mechanism already described is adjusted to tune the bar to the chosen frequency. The oscillator frequency is set to half that used for equalization so that the bar will vibrate at the frequency for which the system was equalized. The switch 65 is left closed on contact 66 since the resistance 58 is comparable to the impedance of the coil 21 but switch 67 is closed on contact 70 since resistance 59 is negligible as compared with the impedance of the transmitter and by connecting the bar to ground at 71 pick-up in the transmitter circuit from the oscillator drive is prevented.

For measuring negative reactances, condenser 56 may be used, switch 73 being closed to short circuit condenser 55 and for measuring positive reactances condenser 55 may be used in which case switch 73 is open and switch 72 is closed to short circuit condenser 56. For small negative or positive reactances both condensers can be used, that is both switches 72 and 73 may be open. For convenience in using the meter the variable condensers 55 and 56 and the variable resistance 61 are provided with direct reading dials. Assuming that the two channels are equalized for the particular test frequency being used and that the potentials $e_1$ and $e_2$ are applied to the bridge as indicated in the drawings, a balance is obtained by varying the condensers 55 and 56 and the resistance 61 until the lower arms of the bridge have the proper relative impedance to produce a difference of potential between points 53 and 54 due to the currents produced by voltage $e_1$ alone to balance voltage $e_2$ so that no current flows in the circuit of receiver 64. For any given values of the elements in the lower arms of the bridge, the potential between 53 and 54 will be directly proportional to $e_1$ so that $e_2$ is balanced against a voltage proportional to $e_1$.

The equation for the mechanical impedance of the moving system in terms of the readings of the bridge elements is developed as follows:

(1) $e_1 = K_v V$ where V is the velocity of the coil 21 in cms. per sec. and $K_v$ is a constant the value of which will depend on the number of coil turns, the flux density of the field and other factors.

(2) $e_2 = K_f \lfloor \theta \, F$ where $K_f$ is a constant the value of which will depend on the spacing of the condenser electrodes, the polarizing voltage used and other factors. F is the force in dynes applied to the moving system and $\lfloor \theta$ represents the displacement in phase between this voltage and $e_1$. When the bridge circuit is balanced in the manner described above so that no sound is heard in the head receivers 64, (3) $e_2 = i_1\left(R - j\frac{1}{wc}\right) + j\frac{i_2}{wc_1} \Big| i = i_1 + i_2$ since $R_1$ is very much greater than R, $$\frac{1}{wc} \text{ or } \frac{1}{wc_1},$$

$i$ is substantially equal to $i_1 + i_2$ so that for practical purposes $$i_1 = i_2 = \frac{i}{2}$$

hence (4) $e_2 = i_1\left[R + j\left(\frac{1}{wc_1} - \frac{1}{wc}\right)\right]$ and (5) $e_1 = i_1 R_1 \Big| i_1 = \frac{e_1}{R_1}$ so (6) $e_2 = \frac{e_1}{R_1}\left[R + j\left(\frac{1}{wc_1} - \frac{1}{wc}\right)\right]$ (7) $\frac{e_2}{e_1} = \frac{K_f \lfloor \theta F}{K_v V} = \frac{K_1}{R_1}\left[R + j\left(\frac{1}{wc_1} - \frac{1}{wc}\right)\right]$ where $$K_1 = \frac{K_f \lfloor \theta F}{K_v}$$

By properly adjusting the resistance 62 and the mutual inductance 63 of the equalizer 52 the difference in phase between $e_1$ and $e_2$ is eliminated so that for the equalized system (8) $Z_m = \frac{e_2}{e_1} = K\left[R + j\left(\frac{1}{wc_1} - \frac{1}{wc}\right)\right]$ Where $Z_m$ is the sum of the mechanical impedances of the device being measured and of the moving system of the impedance meter and $$K = \frac{K_1}{R_1}$$

which is the constant of the bridge as determined below.

To calibrate the bridge, that is, to determine the value of K in Equation 8 and the impedance of the bridge alone, the bridge is first balanced with no external impedance such as 16 attached to the screw 14 and a second balance is obtained with a known mass attached to screw 14 and with a suitable fixed setting of the resistance 61. When the constant is determined for this value of 61 it will hold for all later measurements when the same value of equalization resistance 61 is used.

In the case of the balance for the moving system without any external impedance (9) $Z_{ms} = jK\frac{1}{wc_s}$ where $Z_{ms}$ is the mechanical impedance of the moving system of the impedance meter alone, K is the constant of the bridge as stated above, and $$\frac{1}{wc_s} = \left(\frac{1}{wc_1} - \frac{1}{wc}\right),$$

$c_1$ and $c$ being the readings of the dials of the condensers 55 and 56 when the bridge is balanced without any external impedance and for the balance with the known added mass

(10) $Z_{ms} + Z_{ma} = jK\frac{1}{wc_a}$ where $Z_{ma}$ is the mechanical impedance of the known added mass, K is the constant used above, and $$\frac{1}{wc_a} = \left(\frac{1}{wc_1} - \frac{1}{wc}\right),$$

$c_1$ and $c$ being the readings of the condensers when the bridge is balanced with the known mass added. By substituting for $Z_{ms}$ in (10)

(11) $jK\frac{1}{wc_s} + jwm_a = jK\frac{1}{wc_a} \Big| \begin{array}{l} jwm_a = Zm_a \\ m_a = \text{added mass in grams} \end{array}$ from which

(12) $K = \frac{wm_a}{\frac{1}{wc_a} - \frac{1}{wc_s}} = \frac{w^2 m_a}{\frac{1}{c_a} - \frac{1}{c_s}}$ $Z_{ms} = jwm_s$ where $m_s$ is the effective mass of the moving system and by substituting for K in (10)

(13) $Z_{ms} = j\frac{w^2 m_a}{\frac{1}{C_a} - \frac{1}{C_s}} \times \frac{1}{WC_s} = j\frac{wm_a}{\frac{C_s}{C_a} - 1}$ The procedure in taking impedance measurements of a particular device such as the loudspeaker 16 is to connect it to the moving system of the bridge as shown in Fig. 2. The system is then equalized for phase angle at the test frequency as described above and a balance of the bridge 48 is then obtained. The values of R, $C_1$ and C are read from the dials associated with resistance 61 and the condensers 55 and 56 of the bridge. These values together with the value of K as given in Equation (12) are substituted in Equation (8) and $Z_m$ is then determined. This value includes the impedance of the moving system $Z_{ms}$ as well as the impedance of the device being measured and so that the unknown impedance is found by subtracting from $Z_m$ the moving system impedance as determined from Equation (13).

The impedance of the device for the particular frequency used is then known and its value at any other frequency is obtained by first equalizing for the other test frequency and obtaining a balance as before.

Since the impedance Equations (8) and (13) each involve "$w$" terms ($w=2\pi f$) it will be seen that the bridge cannot be calibrated directly in terms of the impedance of the vibrating system except for a single frequency hence the foregoing substitution of values in the equations to obtain the desired impedance is necessary but since the resistance and capacity values for the equations are read directly from the bridge, the calculation required with this method is reduced to a minimum.

What is claimed is:

1. The method of measuring the mechanical impedance of a vibratory system which comprises vibrating the system, generating voltages directly proportional respectively to the instantaneous velocity and the instantaneous displacement of the system and balancing one of the voltages against a voltage proportional to the other voltage to obtain a complex ratio of the voltages in terms of known electrical impedances.

2. Apparatus for measuring mechanical impedance comprising a vibrating member, means for driving the member, and means driven by the member adapted to be connected to the impedance to be measured comprising means for measuring the instantaneous force applied to the impedance and other means for measuring the instantaneous velocity of the driven means.

3. In a mechanical impedance meter, a vibratable member and tuning means therefor, means for driving the member, a moving system adapted to be connected to the impedance to be measured, an elastic coupling between the system and the member, a condenser transmitter for generating a potential proportional to the force applied to the system comprising an electrode on the member and a second electrode in the system, an element in the system for generating a potential proportional to its instantaneous velocity, and means for comparing the phase angles and magnitudes of the potentials.

4. Apparatus for measuring the mechanical impedance of a vibrating system comprising means for generating voltages directly proportional respectively to the instantaneous velocity and to the instantaneous displacement of the system, the ratio of which is the same proportion of the mechanical impedance to be measured at all frequencies, individual transmission circuits for the voltages, means for equalizing the transmission characteristics of the circuits, and means for comparing the voltages transmitted.

5. In a mechanical impedance meter, a vibrating member, means for driving the member, driven means associated with said member adapted to be connected to the impedance to be measured comprising means for generating a potential proportional to the instantaneous force applied to the impedance, and other means for generating a potential proportional to the instantaneous velocity of the driven means, amplifiers having their inputs associated with the generating means, means for equalizing the phase transmission characteristics of the amplifiers and variable circuit elements for balancing the outputs of the amplifiers.

6. Apparatus for measuring mechanical impedance comprising a moving system including a coil and a metallic diaphragm rigidly connected to the impedance to be measured, a tuned bar, means for driving the bar, an elastic coupling between the system and the bar, a polarized electrode mounted on the bar in operative relation to the diaphragm, means for producing a magnetic field for the coil, and means for comparing the voltages generated in the coil and between the electrode and the diaphragm.

7. In apparatus for measuring mechanical impedance, a bar fixed at one end, means for adjusting the resonant frequency of the bar, a moving system rigidly connected to the impedance to be measured comprising translating devices generating voltages respectively proportional to the velocity and the displacement of the system, an elastic coupling between the system and the bar, and means for vibrating the bar at its resonant frequency.

PAUL B. FLANDERS.